(12) United States Patent
Raether (10) Patent No.: US 9,604,172 B2
(45) Date of Patent: Mar. 28, 2017

(54) DIVERGING NOZZLES AND FILTER ELEMENT CLEANING SYSTEMS USING DIVERGING NOZZLES

(71) Applicant: DONALDSON COMPANY, INC., Bloomington, MN (US)

(72) Inventor: Thomas D. Raether, St. Louis Park, MN (US)

(73) Assignee: DONALDSON COMPANY, INC., Minneapolis, MN (US)

( * ) Notice: Subject to any disclaimer, the term of this patent is extended or adjusted under 35 U.S.C. 154(b) by 161 days.

(21) Appl. No.: 14/196,696

(22) Filed: Mar. 4, 2014

(65) Prior Publication Data
US 2014/0245704 A1 Sep. 4, 2014

Related U.S. Application Data

(60) Provisional application No. 61/772,198, filed on Mar. 4, 2013.

(51) Int. Cl.
*B01D 46/00* (2006.01)
*B01D 46/24* (2006.01)

(52) U.S. Cl.
CPC ..... *B01D 46/0068* (2013.01); *B01D 46/0021* (2013.01); *B01D 46/2411* (2013.01)

(58) Field of Classification Search
CPC B01D 46/00; B01D 46/0068; B01D 46/0021; B01D 46/2411
USPC .................................................. 55/282–305
See application file for complete search history.

(56) References Cited

U.S. PATENT DOCUMENTS

| | | |
|---|---|---|
| 3,683,595 A | 8/1972 | Houghton et al. |
| 3,853,508 A | 12/1974 | Gordon et al. |
| 3,874,857 A | 4/1975 | Hunt et al. |
| 4,218,227 A | 8/1980 | Frey |
| 4,253,856 A | 3/1981 | Paucha |
| 4,280,826 A | 7/1981 | Johnson, Jr. |
| 4,395,269 A | 7/1983 | Schuler |
| 4,578,092 A | 3/1986 | Klimczak |
| 4,645,520 A * | 2/1987 | Huttlin ............... B01D 46/0005 55/302 |
| 4,661,131 A | 4/1987 | Howeth |
| 4,789,387 A | 12/1988 | Nemesi et al. |
| 5,002,594 A | 3/1991 | Merritt |
| 5,062,867 A | 11/1991 | Klimczak |
| 5,562,746 A | 10/1996 | Raether |
| 5,616,171 A | 4/1997 | Barris et al. |
| 6,022,388 A | 2/2000 | Andersson et al. |
| 6,090,173 A | 7/2000 | Johnson et al. |
| 6,129,852 A | 10/2000 | Elliot et al. |
| 6,149,716 A | 11/2000 | Bach et al. |
| 6,394,921 B1 | 5/2002 | Fukuda |
| 6,605,139 B2 | 8/2003 | Felix |
| 6,716,274 B2 | 4/2004 | Gogins et al. |
| 6,902,592 B2 | 6/2005 | Green et al. |
| 6,908,494 B2 | 6/2005 | Gillingham et al. |
| 7,008,465 B2 | 3/2006 | Graham et al. |
| 7,195,659 B2 | 3/2007 | Sporre et al. |
| 7,371,267 B2 | 5/2008 | Pipkorn et al. |

(Continued)

*Primary Examiner* — T. Bennett McKenzie
(74) *Attorney, Agent, or Firm* — Mueting, Raasch & Gebhardt, P.A.

(57) ABSTRACT

Diverging nozzles and filter element cleaning systems using the diverging nozzles to produce reverse gas pulses in a variety of cleaning methods are described herein.

9 Claims, 5 Drawing Sheets

(56) References Cited

U.S. PATENT DOCUMENTS

| | | |
|---|---|---|
| 7,918,907 B2 | 4/2011 | Bitner |
| 7,967,898 B2 | 6/2011 | Sporre et al. |
| 8,075,648 B2 | 12/2011 | Raether |
| 8,118,900 B2 | 2/2012 | Raether et al. |
| 8,491,708 B2 | 7/2013 | Raether |
| 2006/0112667 A1 | 6/2006 | Sporre et al. |
| 2009/0217630 A1* | 9/2009 | Bitner ................ B01D 46/0069 55/294 |
| 2010/0275776 A1* | 11/2010 | Ray .................... B01D 46/0068 95/20 |

* cited by examiner

DIVERGING NOZZLES AND FILTER ELEMENT CLEANING SYSTEMS USING DIVERGING NOZZLES

RELATED APPLICATION

This application claims the benefit under 35 U.S.C. §119 (e) of U.S. Provisional Patent Application No. 61/772,198 filed on Mar. 4, 2013 titled DIVERGING NOZZLES AND FILTER ELEMENT CLEANING SYSTEMS USING DIVERGING NOZZLES, which is hereby incorporated by reference in its entirety.

Diverging nozzles and filter element cleaning systems using the diverging nozzles to produce reverse gas pulses are described herein.

Dust collector devices sometimes use exhaust gas from a valve and pressure tank (reservoir) to back flush filters. Examples of such air filter assemblies are disclosed in, for example, U.S. Pat. Nos. 6,090,173; 4,218,227; 4,395,269; and US Patent Application Publication US 2006/0112667 A1.

Proper and effective cleaning of these filters requires that the exhaust jet provide sufficient pressure in the interior of the filter element to dislodge particulate matter collected on the filter element.

SUMMARY

Diverging nozzles and filter element cleaning systems using the diverging nozzles to produce reverse gas pulses are described herein.

The diverging nozzles may, in one or more embodiments, provide improvements in the cleaning of filter elements using reverse pulses by increasing the average peak pressure as measured in the interior surfaces of the filter elements.

In one aspect, one or more embodiments of a filter element cleaning system as described herein may include: a manifold configured to store pressurized gas; a valve in fluid communication with the manifold; and a nozzle connected to the valve, wherein the nozzle is configured to direct pressurized gas released from the manifold through the valve. The nozzle comprises: a tubular wall comprising a connector end connected to the valve and a free end located distal from the connector end; an interior channel extending through the nozzle from the connector end to the free end, wherein the interior channel defines a channel length extending from the connector end to the free end and a channel width defined by opposing interior surfaces of the tubular wall, wherein the channel length extends along a longitudinal axis and wherein the channel width extends transverse to the longitudinal axis; wherein the interior channel comprises a first section proximate the connector end and a second section proximate the free end such that the first section is located between the second section and the connector end and the second section is located between the first section and the free end; wherein the opposing interior surfaces of the nozzle in the first section diverge from the longitudinal axis at a first angle, wherein the first angle is greater than zero (0) degrees; and wherein the opposing interior surfaces of the nozzle in the second section diverge from the longitudinal axis at a second angle that is greater than the first angle.

In one or more embodiments of the systems described herein, the second section of the interior channel comprises a second section length measured along the longitudinal axis that greater than the channel width at the connector end.

In one or more embodiments of the systems described herein, the second section of the interior channel comprises a second section length measured along the longitudinal axis that is two (2) or more times the channel width at the connector end.

In one or more embodiments of the systems described herein, the second angle is 1.5 or more times as large as the first angle.

In one or more embodiments of the systems described herein, the first angle is three (3) degrees or less.

In one or more embodiments of the systems described herein, the second angle is three (3) degrees or more.

In one or more embodiments of the systems described herein, the second angle is four (4) degrees or more.

In one or more embodiments of the systems described herein, the second angle is five (5) degrees or more.

In one or more embodiments of the systems described herein, the second angle is nine (9) degrees or less.

In one or more embodiments of the systems described herein, the second angle is eight (8) degrees or less.

In one or more embodiments of the systems described herein, the second angle is seven (7) degrees or less.

In one or more embodiments of the systems described herein, the second angle is six (6) degrees.

In one or more embodiments of the systems described herein, the interior channel comprises a circular cross-section taken transverse to the longitudinal axis at any point along the longitudinal axis.

In one or more embodiments of the systems described herein, at least a portion of an exterior surface of the tubular wall comprises threads extending from the connector end towards the free end.

In a second aspect, one or more embodiments of a filter element cleaning system as described herein may include: a manifold configured to store pressurized gas; a valve in fluid communication with the manifold; and a nozzle connected to the valve, wherein the nozzle is configured to direct pressurized gas released from the manifold through the valve. The nozzle comprises: a tubular wall comprising a connector end connected to the valve and a free end located distal from the connector end; an interior channel extending through the nozzle from the connector end to the free end, wherein the interior channel defines a channel length extending from the connector end to the free end and a channel width defined by an interior surface of the tubular wall, wherein the channel length extends along a longitudinal axis and wherein the channel width extends transverse to the longitudinal axis; wherein the interior channel comprises a diverging section that extends from the free end towards the connector end; and wherein the opposing interior surfaces of the nozzle in the diverging section diverge from the longitudinal axis at an angle that is two (2) degrees or more and seven (7) degrees or less.

In one or more embodiments of the systems described herein, the interior channel of the nozzle comprises a first section proximate the connector end such that the first section is located between the diverging section and the connector end and the diverging section is located between the first section and the free end, and wherein the channel width of the nozzle in the first section is constant along the longitudinal axis.

In one or more embodiments of the systems described herein, the diverging section of the interior channel extends along of the entire channel length from the connector end to the free end of the nozzle.

In one or more embodiments of the systems described herein, the opposing interior surfaces of the nozzle in the diverging section diverge from the longitudinal axis at an angle that is three (3) degrees or more.

In one or more embodiments of the systems described herein, the opposing interior surfaces of the nozzle in the diverging section diverge from the longitudinal axis at an angle that is four (4) degrees or more.

In one or more embodiments of the systems described herein, the opposing interior surfaces of the nozzle in the diverging section diverge from the longitudinal axis at an angle that is five (5) degrees or more.

In one or more embodiments of the systems described herein, the opposing interior surfaces of the nozzle in the diverging section diverge from the longitudinal axis at an angle of six (6) degrees.

In one or more embodiments of the systems described herein, the interior channel comprises a diverging section length measured along the longitudinal axis that is greater than the channel width at the connector end.

In one or more embodiments of the systems described herein, the interior channel comprises a diverging section length measured along the longitudinal axis that is two (2) or more times the channel width at the connector end.

In one or more embodiments of the systems described herein, the interior channel comprises a circular cross-section taken transverse to the longitudinal axis at any point along the longitudinal axis.

In one or more embodiments of the systems described herein, at least a portion of an exterior surface of the tubular wall comprises threads extending from the connector end towards the free end.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the diverging nozzles and filter element cleaning systems using the diverging nozzles described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

Figure 1:
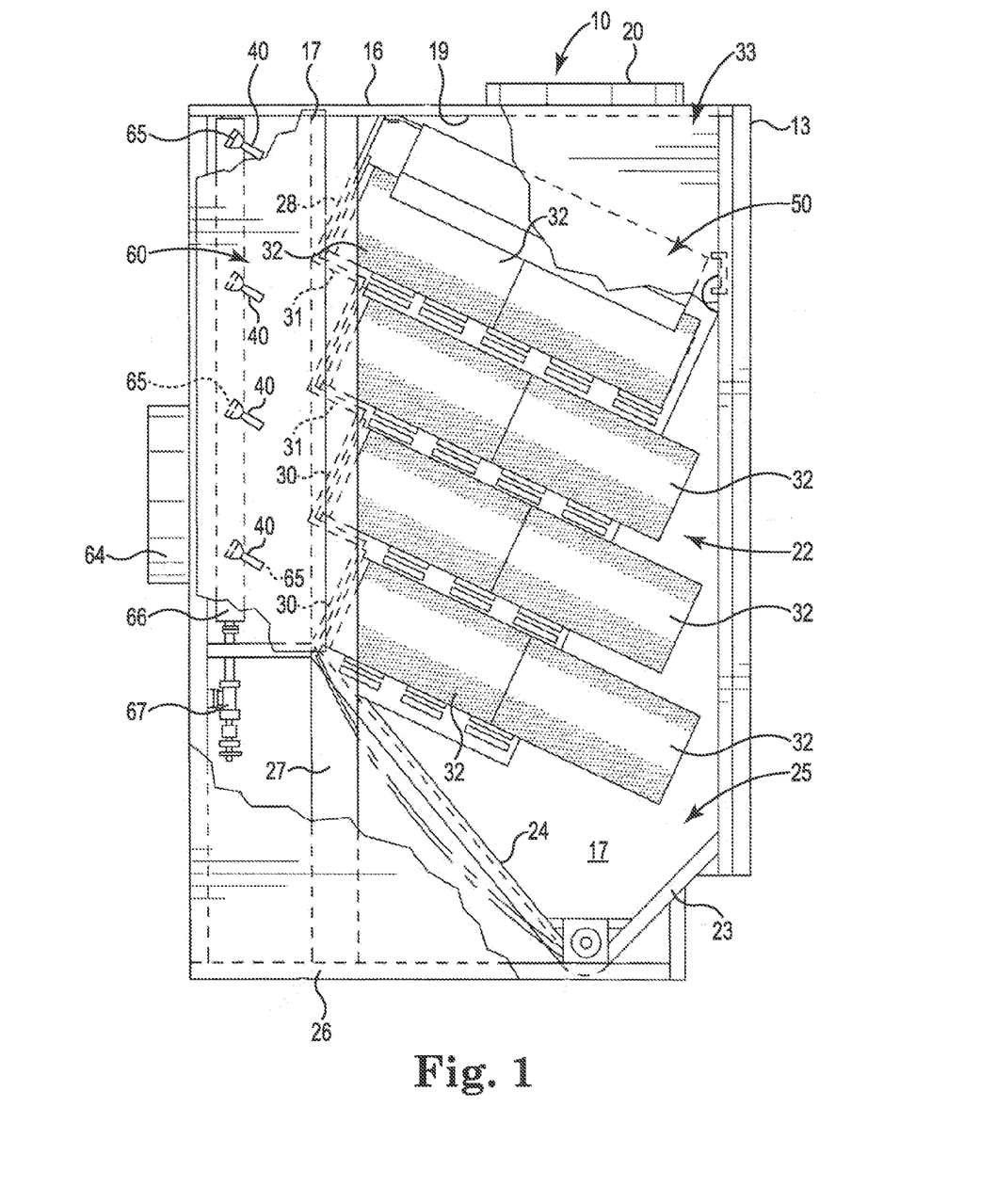
FIG. 1 is a side elevational view, partially broken away, of one illustrative embodiment of an air filter system utilizing pressurized gas to clean filter elements contained therein.

One illustrative embodiment of a filtration system or assembly is depicted generally at 10 in FIG. 1. Although the system may be used for filtering air and is described in connection with air filtration herein, the system could be used to filter any gas other than air. Also, although the filtration system depicted in FIG. 1 may include a filter element cleaning system and diverging nozzles as described herein, the filter element cleaning systems and diverging nozzles could be used with filtrations systems other than the system depicted in FIG. 1.

The filtration system depicted in FIG. 1 includes a side wall panel 17 that is broken away to illustrate the arrangement of various portions of the system located within the housing. An upper wall panel 16 has an inner wall surface 19. In the depicted embodiment, an air inlet 20 is positioned in the upper wall panel 16 so that particulate-laden air or other fluid is introduced into an unfiltered fluid chamber 22. The unfiltered fluid chamber 22 is defined by a door 13, the upper wall panel 16, two pair of opposing side wall panels 17, stepped wall structure or baffle arrangement 28, and a pair of sloping surfaces 23, 24. In this embodiment, the sloping surfaces 23, 24 partially define a collection area or hopper 25 within a base portion of the assembly. A bottom base panel or frame 26 is sealed to the side wall panels 17 in any suitable manner.

Secured to a structural frame member 27 along each of the side wall panels 17 is baffle member, spacer wall, or tubesheet structure 28, as mentioned above. In this embodiment, the tubesheet 28 has a step-like design to which are mounted individual filter elements 32. The tubesheet structure 28 is preferably sealed on all sides to effectively seal the unfiltered fluid chamber 22 from a filtered fluid chamber 60. In this embodiment, the structure 28 has three steps, with each step including an upwardly extending back member 30 and a leg member 31 extending at right angles therefrom.

In the embodiment shown, the filter elements 32 are mounted to the stepped, tubesheet structure 28, so that the filter elements 32 are mounted in the unfiltered air chamber 22 in a stepped or spaced apart overlapping relationship, and in the depicted embodiment, in a generally downward direction at an acute angle of inclination with respect to a horizontal plane of the upper surface panel 16. In this manner, a distribution space 33 is defined in the uppermost portion of the filter assembly 10 by an inclined baffle 50, the side wall panels 17, the upper wall panel inner surface 19, and front access door 13. As fluid containing particulate material to be removed enters the assembly 10 from the inlet 20, it is received into the distribution space 33 prior to being filtered.

Figure 2:
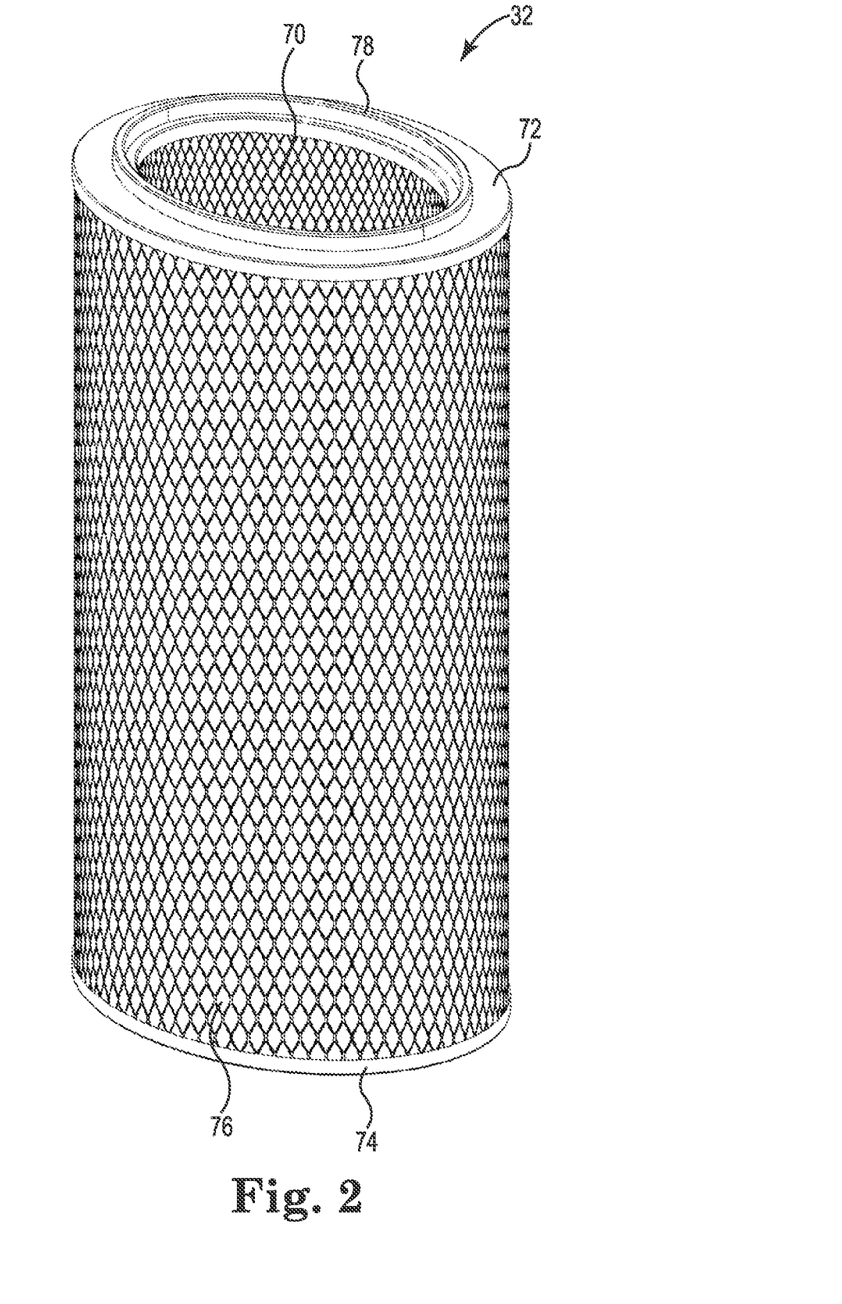
FIG. 2 is a perspective view of one illustrative embodiment of a filter element which can be used in the system of FIG. 1.
Figure 3:
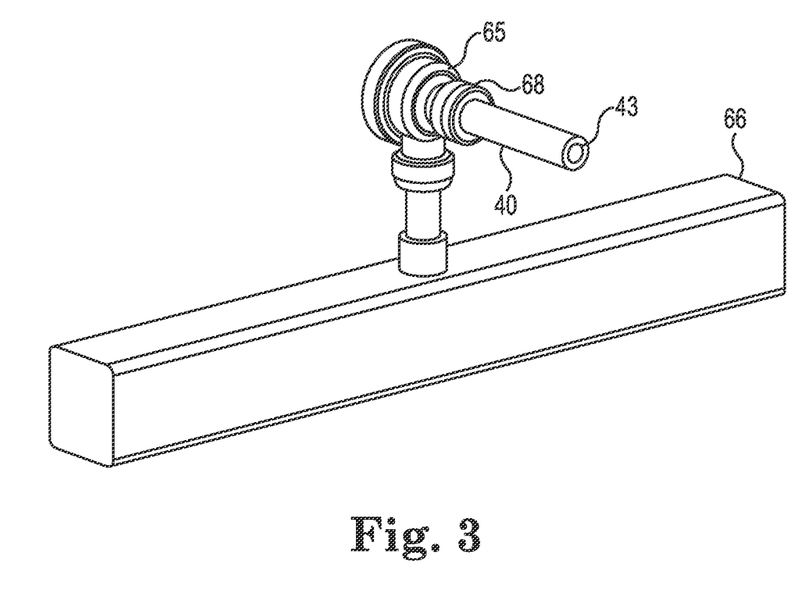
FIG. 3 is a perspective view of one illustrative embodiment of diverging nozzle connected to a valve in fluid communication with a manifold containing pressurized gas as described herein.

Individual tubular filter elements 32 are provided in the filtration system 10 to filter particulate material from a gas. As used herein, the term "tubular filter element" means that the element has filter media that circumscribes an interior volume. In such an arrangement, the airflow turns a corner during the filtration process. For forward flow systems, the air flows from a region outside of the filter element, through the media, into the interior volume, and then turns a corner to exit the interior volume through an opening in one of the end caps of the filter element 32. In reverse-flow systems, pressurized gas pulses are delivered in a direction that is the reverse of forward flow. In the illustrative embodiment of filter element 32 depicted in FIG. 2, the open filter interior 70 is oval in shape, although the open filter interiors may take any shape, e.g., circular, elliptical, triangular, etc. The depicted filter element 32 has a first end cap 72 and an opposite, second end cap 74. Filter media 76 extends between the end caps 72 and 74. An axial gasket 78 may, in one or more embodiments, project from the first end cap 72, such that it can be compressed to form an axial seal with the tubesheet 28.

Referring again to FIG. 1, one illustrative embodiment of a filter element cleaning system for cleaning each filter element 32 is provided in the filtration system 10. In the embodiment shown, the filter element cleaning system includes a plurality of valves 65 with diverging nozzles 40 that are positioned within filtered fluid chamber 60 and directly in line with an outlet opening in the tubesheet structure 28 so as to direct a jet of compressed gas (e.g., air, etc.) into the open interior 70 of each of the filter elements 32. The pressurized gas is supplied to the valves 65 through a manifold 66. Supply line 67 provides pressurized gas the manifold 66 from a source that is not depicted in FIG. 1, such as a compressor, etc.

In operation, fluid (e.g., air, etc.) to be filtered flows into the air filtration system 10 through the inlet 20. From there, it flows through the filter elements 32. The filter media 76 removes particulate material from the fluid. The filtered fluid flows into the open filter interior 70, through the holes in the tubesheet 28, and into the filtered fluid chamber 60. From there, the clean fluid flows out of the system 10 through an outlet 64.

Periodically, the filter elements 32 will be cleaned by pulsing a jet of gas (e.g., air) from the downstream side of the media 76 to the upstream side of the media 76. Specifically, a jet of pressurized gas will be directed through each of the valves 65. Diverging nozzles 40 on the valves 65 direct a jet of pressurized gas through each opening in the tubesheet 28 and into the open filter interior 70. In one or more embodiments, the diverging nozzles 40 on the valves 65 may be identical while, in one or more alternative embodiments, the diverging nozzles 40 on the valves 65 may be different depending on a variety of factors, such as, the size and/or shape of the filter elements being cleaned.

The jet of pressurized gas then flows through the media 76 from the downstream side to the upstream side. The jet of pressurized gas may, in or more embodiments, dislodge debris and particulate material from the upstream side of the filter media 76. The dislodged debris and particulate material falls into the hopper 17 in the depicted system.

FIGS. 3-7 depict one illustrative embodiment of a diverging nozzle as described herein. The diverging nozzle 40 is attached to a valve 65 which is, in turn, attached to a manifold 66 as described herein. In particular, the diverging nozzle 40 is depicted as being connected to the valve 65 with a collar 68, although many other different connection mechanisms could be used to attach to attach a diverging nozzle 40 to a valve 65. Although the diverging nozzle 40 is depicted as being connected directly to the valve 65, in one or more alternative embodiments, the diverging nozzle 40 may be connected to the valve 65 through one or more intermediate conduits as needed. Even though one or more intermediate conduits may be provided between the valve 65 and the diverging nozzle 40, the diverging nozzle 40 is still, for the purposes of the systems and methods described herein, still connected to the valve 65 because pressurized gas delivered by the valve 65 will eventually pass through the diverging nozzle 40.

Figure 4:
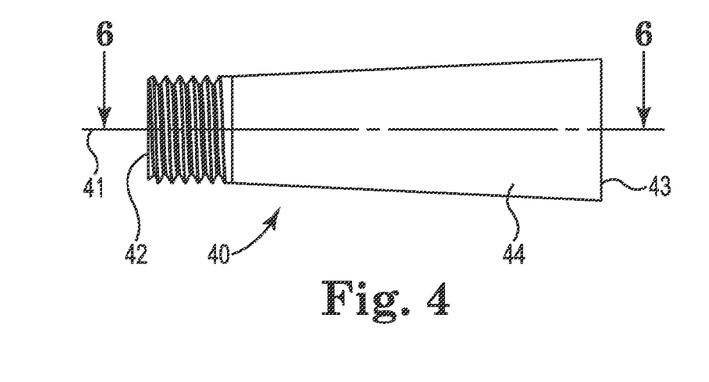
FIG. 4 is a side elevational view of one illustrative embodiment of a diverging nozzle as described herein.
Figure 5:
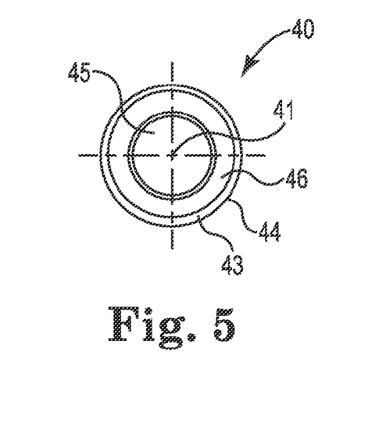
FIG. 5 is an end view of the diverging nozzle of FIG. 4.
Figure 6:
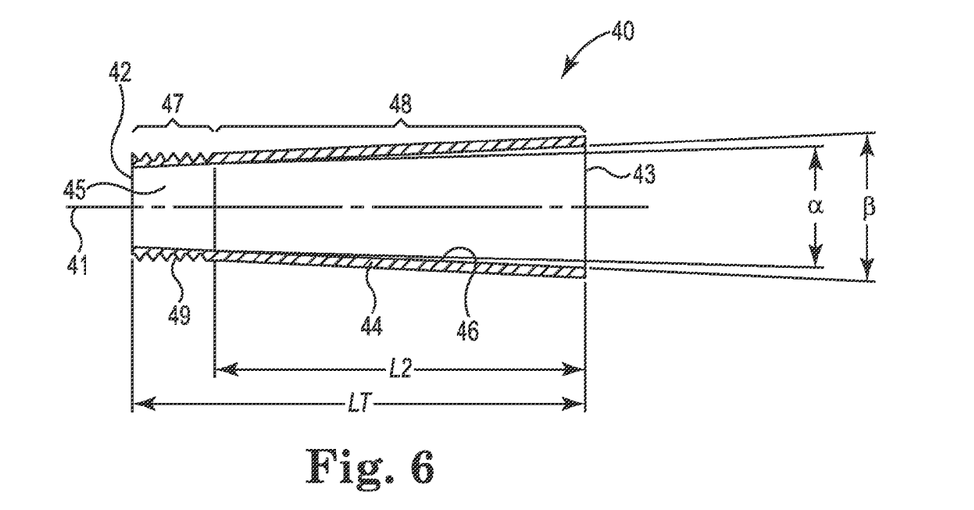
FIG. 6 is a cross-sectional view of the diverging nozzle of FIG. 4 taken along line 6-6 in FIG. 4.

Referring now to FIGS. 4-6, the illustrative embodiment of diverging nozzle 40 is treated in more detail. The diverging nozzle 40 includes a connector end 42 and a free end 43 with a longitudinal axis 41 extending between the connector end 42 and the free end 43. A tubular wall 44 extends between the connector end 42 and the free end 43 and defines an interior channel 45 through which pressurized gas is delivered from the valve 65. In particular, pressurized gas enters the interior channel 45 of the diverging nozzle 40 through the connector end 42 and exits the interior channel 45 through the free end 43.

In one or more embodiments, the interior channel 45 may have a circular cross-section taken transverse to the longitudinal axis 41 (in which case, the channel width may be defined as the diameter of the channel 45). Although, in the depicted embodiments, the interior channel 45 has a circular cross-section, variations in a circular cross-section may be allowable in diverging nozzles as described herein. For example, in one or more embodiments, the cross-section of the interior channel 45 may be in a shape that approximates a circle, such as, e.g., a hexagon, octagon, etc.

The interior channel 45 of the diverging nozzle 40 defines a channel length LT that extends from the connector end 42 to the free end 43 of the diverging nozzle 40. The diverging nozzle 40 also includes a channel width that is defined by opposing interior surfaces 46 of the tubular wall 44 (it being understood that the opposing interior surfaces 46 may, in one or more embodiments, be parts of the same surface that are simply located on opposite sides of the channel 45 relative to the longitudinal axis 41). In general, the channel length LT can be described as extending along the longitudinal axis 41 while the channel width can be described as extending transverse to the longitudinal axis 41.

In one or more embodiments, the interior channel can be provided in parts. In particular the interior channel 45 may include a first section 47 proximate the connector end 42 and a second section 48 proximate the free end 43 of the diverging nozzle. As a result, the first section 47 is located between the second section 48 and the connector end 42 while the second section 48 is located between the first section 47 and the free end 43 of the diverging nozzle 40. In one or more embodiments, the first section 47 may begin at the connector end 42, while in one or more alternative embodiments, the first section 47 may begin at some location between the connector end 42 and the second section 48.

In one or more embodiments, the channel width of the interior channel 45 of the diverging nozzle 40 may begin increasing while the opposing interior surfaces begin diverging at or near the connector end 42. In the embodiment depicted in, e.g., FIG. 6, the opposing interior surfaces 46 of the diverging nozzle 40 in the first section 47 diverge at an angle α (alpha). In one or more embodiments, the angle α (alpha) at which the opposing interior surfaces 46 of the first section 47 diverge is greater than zero. In one or more embodiments, the angle α (alpha) may be 3° or less.

In one or more embodiments, the channel width of the interior channel 45 of the diverging nozzle 40 continues increasing as the opposing interior surfaces 46 continue diverging in the second section 48. In the embodiment depicted in FIG. 6, the divergence of the opposing interior surfaces 46 of the interior channel 45 within second section 48 is represented by angle β (beta) as seen in FIG. 6. In one or more embodiments of the diverging nozzles as described herein, the opposing interior surfaces 46 in the second section 48 of the interior channel 45 of the diverging nozzle 40 may diverge at an angle β (beta) that is greater than the angle α (alpha) at which the first section 47 diverges. In one or more embodiments, the angle β (beta) at which the opposing interior surfaces 46 in the second section 48 diverge may be 1.5 or more times as large as the angle α (alpha) at which the opposing interior surfaces 46 in the first section 47 diverge. In one or more embodiments, the angle β (beta) at which the opposing interior surfaces 46 in the second section 48 diverge may be 3° or more. In one or more embodiments, the angle β (beta) at which the opposing interior surfaces 46 in the second section 48 diverge may be 4° or more. In one or more embodiments, the angle β (beta) at which the opposing interior surfaces 46 in the second section 48 diverge may be 5° or more. In one or more embodiments, the angle β (beta) at which the opposing interior surfaces 46 in the second section 48 diverge may be 9° or less. In one or more embodiments, the angle β (beta) at which the opposing interior surfaces 46 in the second section 48 diverge may be 8° or less. In one or more embodiments, the angle β (beta) at which the opposing interior surfaces 46 in the second section 48 diverge may be 7° or less. In one or more embodiments, the angle β (beta) at which the opposing interior surfaces 46 in the second section 48 diverge may be 6°.

Although the illustrative embodiment of diverging nozzle 40 depicted in FIGS. 4-6 includes a first section 47 and a second section 48 in which the opposing interior surfaces 46 diverge at different angles, in one or more alternative embodiments, the diverging nozzle 40 may include an interior channel 45 with opposing interior surfaces 46 that diverge at the same angle along its entire length or that includes a first section 47 in which opposing interior surfaces 46 defining the channel width do not diverge (i.e., the opposing interior surfaces 46 of the interior channel 45 are substantially parallel to each other such that the interior channel width is constant along the length of the first section 47 (with allowances for manufacturing tolerances).

In either embodiment, i.e., whether the opposing interior surfaces 46 of the interior channel 45 diverge at one angle along the entire length of the interior channel 45 (in which case the second section 48 may be described as having a length L2 equal to the total length LT of the nozzle 40), or the opposing interior surfaces 46 of the interior channel 45 diverge only within a second section 48 that occupies less than the total length LT of the nozzle 40 (while the opposing interior surfaces 46 in a first section 47 do not diverge), the opposing interior surfaces 46 defining the channel width of the channel 45 may diverge in the diverging section from the longitudinal axis 41 at an angle that is, at a lower end, 2° or more (where the diverging section occupies all or less than the entire length LT of the channel 45). At the upper end of both of the two embodiments, the divergence of the opposing interior surfaces 46 of the diverging section of the nozzle may be at an angle of 7° or less. At the upper end of both of the two embodiments, the divergence of the opposing interior surfaces 46 of the diverging section of the nozzle may, in one or more alternative embodiments, be at an angle of 3° or more. In still other embodiments, the divergence of the opposing interior surfaces 46 of the diverging section of the nozzle of both embodiments may be at an angle of 4° or more. In still other embodiments, the divergence of the opposing interior surfaces 46 of the diverging section of the nozzle of both embodiments may be at an angle of 5° or more. In both of the two embodiments, the divergence of the opposing interior surfaces 46 of the diverging section of the nozzle may be at an angle of 6°.

In one or more embodiments of the diverging nozzles as described herein, the length L2 of the diverging second section 48 of the interior channel 45 (see FIG. 6) as measured along the longitudinal axis 41 may be related to the channel width of the interior channel 45 at the connector end 42 of the diverging nozzle 40 (where the diameter of the interior channel 45 at the connector end 42 is measured transverse to the longitudinal axis 41). The relationship between the channel width of the interior channel 45 and the length L2 of the diverging second section 48 holds for those embodiments in which the diverging second section 48 occupies all or less than the total length LT of the channel 45. For example, in one or more embodiments, the length L2 of the diverging second section 48 of the interior channel 45 may be at least as long as the channel width of the interior channel 45 at the connector end 42. In one or more other embodiments, the length L2 of the diverging second section 48 of the interior channel 45 may be two or more times the channel width of the interior channel 45 at the connector end 42. In still other embodiments, the length L2 of the diverging second section 48 of the interior channel 45 may be three or more times the channel width of the interior channel 45 at the connector end 42. In yet other embodiments, the length L2 of the diverging second section 48 of the interior channel 45 may be four or more times the channel width of the interior channel 45 at the connector end 42.

Another feature that may be provided in one or more embodiments of the diverging nozzles as described herein are threads 49 located at the connector end 42 of the diverging nozzle 40 and extend from the connector end 42 towards the free end 43. The threads 49 may be used to connect the diverging nozzle 42 and a valve or to an intermediate conduit interposed between the nozzle 40 and a valve. Although the diverging nozzle 40 includes threads to assist in connecting the diverging nozzle 40 to a valve, many other fluid connection structures may be used to connect the diverging nozzle 40 to a valve, such as, e.g., quick connect couplings, etc. In the depicted embodiment, the threads 49 are located on the exterior surface of the diverging nozzle 40. In one or more alternative embodiments, however, the threads or other connection mechanism may be located on the interior surface 46 of the diverging nozzle 40.

Figure 7:
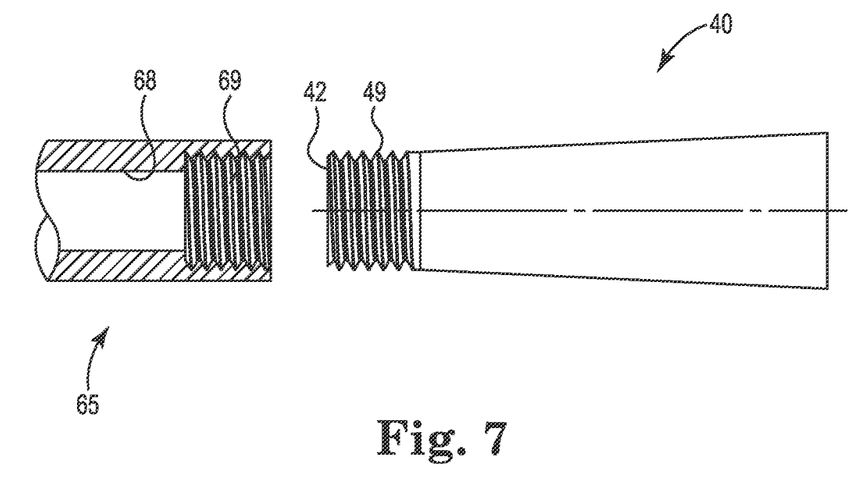
FIG. 7 is a partial cross-sectional view depicting one illustrative embodiment of a connection between a diverging nozzle and a valve as described herein.

Referring to FIG. 7, one illustrative embodiment of a connection of a diverging nozzle 40 to a valve 65 is depicted. The diverging nozzle 40 includes threads 49 on its exterior surface at the connector end 42 of the diverging nozzle 40. Those threads 49 mate with a set of internal threads 69 on the valve 65 to retain the diverging nozzle 40 in fluid communication with the valve 65. In the depicted embodiment the threads 69 are formed in an interior surface 68 of the valve 65. In one or more embodiments, the interior diameter of the valve 65 as defined by the interior surface 68 may be substantially equal to the interior diameter of the diverging nozzle 40 at the connector end 42 such that gas flowing through the valve 65 into the diverging nozzle 40 sees little or no discontinuity when moving from the valve 65 to the diverging nozzle 40. Such a smooth transition between the valve 65 and the diverging nozzle 40 may be useful in limiting pressure losses, reducing noise, etc.

The complete disclosure of the patents, patent documents, and publications identified herein are incorporated by reference in their entirety as if each were individually incorporated.

Illustrative embodiments of the filter cartridges and filter systems incorporating the filter cartridges are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

I claim:

1. A filter element cleaning system comprising:
   a manifold configured to store pressurized gas;
   a valve in fluid communication with the manifold; and
   a nozzle connected to the valve, wherein the nozzle is configured to direct pressurized gas released from the manifold through the valve, and wherein the nozzle comprises:
      a tubular wall comprising a connector end connected to the valve and a free end located distal from the connector end;
      an interior channel extending through the nozzle from the connector end to the free end, wherein the interior channel defines a channel length extending from the connector end to the free end and a channel width defined by an interior surface of the tubular wall, wherein the channel length extends along a longitudinal axis and wherein the channel width extends transverse to the longitudinal axis;
      wherein the interior channel comprises a diverging section that extends along the entire channel length from the connector end to the free end of the nozzle,
      wherein opposing interior surfaces of the nozzle in the diverging section diverge at an angle that is two (2) degrees or more and seven (7) degrees or less.

2. A system according to claim 1, wherein the opposing interior surfaces of the nozzle in the diverging section diverge at an angle that is three (3) degrees or more and seven (7) degrees or less.

3. A system according to claim 1, wherein the opposing interior surfaces of the nozzle in the diverging section diverge at an angle that is four (4) degrees or more and seven (7) degrees or less.

4. A system according to claim 1, wherein the opposing interior surfaces of the nozzle in the diverging section diverge at an angle that is five (5) degrees or more and seven (7) degrees or less.

5. A system according to claim 1, wherein the opposing interior surfaces of the nozzle in the diverging section diverge at an angle of six (6) degrees.

6. A system according to claim 1, wherein the interior channel comprises a diverging section length measured along the longitudinal axis that is greater than the channel width at the connector end.

7. A system according to claim 1, wherein the interior channel comprises a diverging section length measured along the longitudinal axis that is two (2) or more times the channel width at the connector end.

8. A system according to claim 1, wherein the interior channel comprises a diverging section length measured along the longitudinal axis that is two (2) to five (5) times the channel width at the connector end.

9. A filter element cleaning system comprising:
   a manifold configured to store pressurized gas;
   a valve in fluid communication with the manifold; and
   a nozzle connected to the valve, wherein the nozzle is configured to direct pressurized gas released from the manifold through the valve, and wherein the nozzle comprises:
      a tubular wall comprising a connector end connected to the valve and a free end located distal from the connector end;
      an interior channel extending through the nozzle from the connector end to the free end, wherein the interior channel defines a channel length extending from the connector end to the free end and a channel width defined by an interior surface of the tubular wall, wherein the channel length extends along a longitudinal axis and wherein the channel width extends transverse to the longitudinal axis;
      wherein the interior channel comprises a diverging section that extends along the entire channel length from the connector end to the free end of the nozzle,
      wherein the interior channel comprises a diverging section length measured along the longitudinal axis that is two (2) to five (5) times the channel width at the connector end,
      wherein opposing interior surfaces of the nozzle in the diverging section diverge at an angle that is two (2) degrees or more and seven (7) degrees or less.

* * * * *